United States Patent [19]
Kondo et al.

[11] Patent Number: 5,160,358
[45] Date of Patent: Nov. 3, 1992

[54] PROCESS FOR PRODUCING SILICA GLASS PLATE HAVING CONTROLLED REFRACTIVE INDEX DISTRIBUTION

[75] Inventors: Osamu Kondo; Masukazu Hirata; Mitsuzo Arii, all of Tokyo, Japan

[73] Assignee: Mitsubishi Gas Chemical Co., Inc., Tokyo, Japan

[21] Appl. No.: 692,457

[22] Filed: Apr. 17, 1991

Related U.S. Application Data

[63] Continuation-in-part of Ser. No. 501,132, Mar. 29, 1990, abandoned.

[30] Foreign Application Priority Data

Mar. 31, 1989 [JP] Japan .................................. 1-78298
Mar. 31, 1989 [JP] Japan .................................. 1-78301

[51] Int. Cl.$^5$ ............................................ C03B 20/00
[52] U.S. Cl. ....................................... 65/18.2; 501/12; 65/901; 65/3.15
[58] Field of Search ............... 65/3.14, 30.12, 30.13, 65/3.15, 31, 30.1, 18.2, 18.1, 901; 423/338; 501/12

[56] References Cited

U.S. PATENT DOCUMENTS

| | | | |
|---|---|---|---|
| 4,403,031 | 9/1983 | Borrelli et al. | 439/32.1 |
| 4,410,345 | 10/1983 | Usui et al. | 65/31 |
| 4,436,542 | 3/1984 | Kurosaki | 65/901 |
| 4,525,189 | 6/1985 | Ohmi et al. | 65/31 |
| 4,528,010 | 7/1985 | Edahiro et al. | 65/18.1 |
| 4,563,205 | 1/1986 | Asahara et al. | 65/301.3 |
| 4,640,699 | 2/1987 | Ohmi et al. | 65/31 |
| 4,767,435 | 8/1988 | Omi et al. | 65/31 |
| 4,778,256 | 10/1988 | Serizawa | 430/2 |
| 4,778,744 | 10/1988 | Borrelli et al. | 427/419.8 |
| 4,797,376 | 1/1989 | Caldwell et al. | 501/12 |
| 4,902,650 | 2/1990 | Caldwell et al. | 501/55 |

FOREIGN PATENT DOCUMENTS

| | | |
|---|---|---|
| 56-145125 | 11/1981 | Japan . |
| 60-76701 | 5/1985 | Japan . |
| 60-81033 | 5/1985 | Japan . |
| 61-232248 | 10/1986 | Japan . |
| 61-242918 | 10/1986 | Japan . |
| 63-195132 | 8/1988 | Japan . |
| 63-206218 | 8/1988 | Japan . |

OTHER PUBLICATIONS

Omi et al., Chemical Abstracts, vol. 104, No. 14, Apr. 1986, p. 310 Abstract No. 114771y.
Aoki, Chemical Abstracts, vol. 11, No. 6, Feb. 1989, p. 298 Abstract No. 43681e.
Ito, Chemical Abstracts, vol. 108, No. 14, Apr. 1988, p. 330, Abstract No. 117554y.
Shibuya et al., Chemical Abstracts, vol. 109, No. 2, Jul. 1988, p. 261 Abstract No. 10642u.
Nippon Denshin, Patent Abstracts of Japan, vol. 6, No. 241, (P-158) (1119) Nov. 30, 1982.

Primary Examiner—Kenneth M. Schor
Assistant Examiner—John J. Bruckner
Attorney, Agent, or Firm—Wenderoth, Lind & Ponack

[57] ABSTRACT

A process for easily producing a silica glass plate having an internal refractive index distribution suitable for a planar optical waveguide involves carrying out the following steps.

(a) A porous silica gel plate produced by a sol-gel method is kept in a reactor, the pressure of which is reduced to a substantially vacuum state.

(b) Germanium tetrachloride gas is introduced into the reactor at a partial pressure appropriate to establish an absorption equilibrium between a desired concentration of germanium tetrachloride in said porous silica gel plate and a partial pressure of germanium tetrachloride introduced.

(c) The partial pressure of germanium tetrachloride in step (b) is reduced so as to desorb germanium tetrachloride from the surface of the porous silica gel plate.

(d) The porous silica gel plate having a described concentration distribution is brought into contact with water within or outside the reactor so as to fix the distribution.

(e) The porous silica gel plate is calcined at a temperature of not less than 900° C. to render it nonporous.

7 Claims, 4 Drawing Sheets

DISTANCE FROM THE CENTER

DISTANCE FROM THE CENTER

PROCESS FOR PRODUCING SILICA GLASS PLATE HAVING CONTROLLED REFRACTIVE INDEX DISTRIBUTION

This application is a continuation-in-part of application Ser. No. 07/501,132, filed Mar. 29, 1990, now abandoned.

FIELD OF THE INVENTION

This invention relates to a process for producing a silica glass plate having an internal refractive index distribution. More specifically, it relates to a process for producing a silica glass having a controlled refractive index distribution and being suitable for a base material for planar optical waveguide.

PRIOR ARTS OF THE INVENTION

In a network using optical fibers, a variety of optical function devices such as an optical coupler having functions for optical branching and convergence, and the like are used as essential parts. For further wide use of an optical network, however, it is desired and required that these optical function devices are provided at low prices. Optical devices of a planar optical waveguide type are preferred to meet the above requirement. In order to realize commercially demanded low-priced optical devices, it is important to provide a silica glass plate with a refractive index distribution by a simple process with high accuracy.

There are several conventional methods to realize a variety of optical function devices by introducing into glass a substance which changes the refractive index.

One of such methods is known as an ion-exchange method, in which the ion exchange is carried out by immersing a multi-component glass containing exchangeable ion components in a molten salt containing ion which increases or decreases the refractive index (E. Okuda et al. Applied Optics, 23, 1747, (1984). This method has a characteristic feature in that a refractive index distribution having a very smooth and nearly ideal parabolic form can be provided. However, this method has the following defects; Since the diffusion rate of ion is small, this method is limited to monovalent ions having a high mobility and cannot be applied to ions having a large valence. In order to obtain a necessary refractive index, it is required to use a high-temperature molten salt for a high mobility are carry out the immersion for a long period of time. Further, this method cannot be said to be highly mass-productive for producing an optical waveguide, since its doping process requires complicated steps of producing a metal mask on a glass surface, doping an unmasked portion, and then removing the metal mask by melting it.

There is another technique called a molecular stuffing method, in which various dopants for controlling a refractive index are introduced into a porous glass [e.g. a glass obtained by phase-splitting treatment of borosilicate glass, known as Vycor (trade name) of U.S. Coning] under a liquid or gaseous phase.

The molecular stuffing method in a liquid phase comprises immersing a porous glass in an aqueous solution containing monovalent ions such as $Cs^+$, $Tl^+$, etc., to diffuse the ions into pores of the porous of the porous glass (doping), eluting ions from the porous glass in the presence of an ethanol solution (unstuffing), i.e. depositing the ions in the pores, and subjecting the stuffed glass to sintering treatment to render it nonporous (Asahara, Ceramics, 21, 425 (1988), Asahara et al U.S. Pat. No. 4,563,205, Ohmi et al, Japanese Laid-Open Patent Publication No. 186424/1985, etc.). Having a merit in that a large-sized rod lens, etc., can be manufactured around room temperature for a relatively short period of time, this method has a defect in that the dopant substance usable is limited to water-soluble salts. There is further a defect in that $Tl^+$ is highly toxic. Moreover, if net-modifying oxide ions such as $Cs^+$ and $K^+$ are doped into a porous gel manufactured by a sol-gel method, the doped gel undergoes crystallization into cristobalite occurs at a sintering time for nonporousness formation, and impairment of transparency and fracturing sometimes occur.

On the other hand, as a method for stuffing a porous glass under a gaseous phase, Japanese Laid-Open Patent Publication No. 81033/1985 proposes a process for producing an optical fiber preform, etc., which comprises sintering a porous glass under an atmosphere of a doping substance. This process is proposed as a process for uniformly introducing a fluorine compound into an aggregate of fine glass particles, and has a characteristic feature in that the concentration of doping fluorine ion can be controlled by means of a partial pressure of the fluorine compound in the atmosphere. In this process, however, the glass is doped with fluoride and at the same time, the glass is sintered at a high temperature to fix the fluoride in the glass. The fluoride uniformly introduced is hence fixed as it is. It is therefore impossible to provide the interior of the glass with a refractive index distribution.

Japanese Laid-Open Patent Publication No. 60121/1988 proposes a method of doping a porous glass, in which neodymium trichloride ($NdCl_3$) is used as a dopant, a porous glass is charged into a furnace together with $NdCl_3$ in a container, and the furnace is heated to a high temperature to gasify $NdCl_3$, whereby the porous glass is doped with $NdCl_3$ gas. This method has a characteristic feature in that even a dopant having a low vapor pressure such as $NdCl_3$ can be doped into a porous glass. In this method, the partial dopant pressure in an atmosphere and the concentration of the dopant to be doped into a porous glass can be controlled by means of an amount of $NdCl_3$ to be charged into the furnace. The dopant is doped into a porous glass uniformly, oxidized into $Nd_2O_3$ as it is, and fixed. In this method, therefore, it is disadvantageously required to carry out a reaction at a high temperature, and further, it is impossible to provide the interior of the porous glass with a refractive index distribution and the resultant product cannot be used as an optical waveguide.

Japanese Laid-Open Patent Publication No. 292623/1987 proposes a process which comprises doping a porous gel prepared by a sol-gel method with $GeCl_4$ in a gaseous phase, fixing the doped $GeCl_4$ by hydrolysis and calcining the porous gel. According to this process, a prescribed concentration of $GeCl_4$ can be uniformly doped into a porous gel. Even in this process, however, the dopant is merely uniformly doped, fixed as it is, and calcined. Therefore, even according to this process, the porous gel cannot be provided with a refractive index distribution, nor can the resultant product be used as an optical waveguide.

SUMMARY OF THE INVENTION

It is an object of this invention to provide a process for easily producing a silica glass plate having an internal refractive index distribution suitable for a planar optical waveguide.

It is another object of this invention to provide a process for easily producing a silica glass plate having a controlled refractive index in the presence of germanium tetrachloride which is too reactive to handle easily.

It is further another object of this invention to provide a process for producing a silica glass having a controlled refractive index distribution, in which the silica glass plate can be produced for a short period of time with ease.

According to this invention, there is provided a process for producing a silica glass plate having a controlled refractive index, which comprises the steps of:

(a) keeping a porous silica gel plate produced by a sol-gel method in a reactor of which the pressure is reduced to a substantially vacuum state, thereby to remove water within said porous silica gel plate, (b) introducing germanium tetrachloride gas into the reactor at a partial pressure appropriate to establish an absorption equilibrium between a desired concentration of germanium tetrachloride in said porous silica gel plate and a partial pressure of germanium tetrachloride introduced, thereby to dope said porous silica gel plate and maintain said partial pressure of germanium tetrachloride for a period of time sufficient to achieve the absorption equilibrium, (c) reducing the partial pressure of germanium tetrachloride in step (b), thereby to desorb germanium tetrachloride from a surface of the porous silica gel plate and form a concentration distribution of germanium tetrachloride between an interior of said porous silica gel plate and an outward portions thereof, (d) bringing said porous silica gel plate having said concentration distribution into contact with water within or outside the reactor, thereby to hydrolyze the germanium tetrachloride and fix it within said porous silica gel plate as germanium oxide, and (e) calcining said porous silica gel plate at a temperature of not less than 900° C. to render it nonporous, thereby to form the silica glass plate having a controlled refractive index.

DETAILED DESCRIPTION OF THE INVENTION

Figure 1:
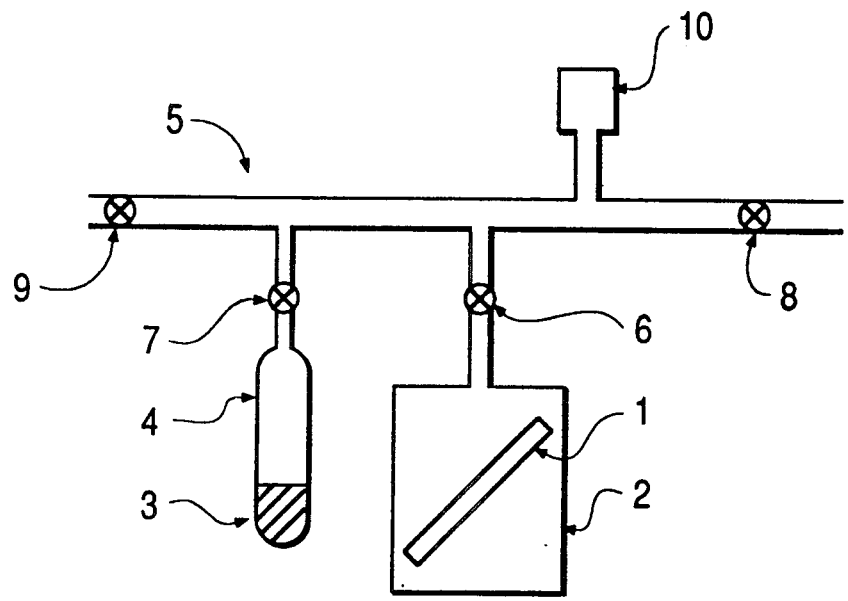
FIG. 1 is a schematic sectional view showing one embodiment of an apparatus for use in this invention.

The porous silica gel plate produced by a sol-gel method and used in this invention, is prepared by hydrolyzing silicon alkoxide to form a sol, and drying the sol in a suitable container. This sol-gel method has the following advantages: A highly pure silica sol can be obtained since the raw material used is a liquid and easily purified; A porous gel plate can be easily obtained in a container in which a sol is dried, and the like. A silica glass plate obtained by calcining the resultant silica gel plate can be easily matched with optical fibers of silica. Therefore, a silica glass plate produced by a sol-gel method is suitable for a base plate for a planar optical waveguide, etc. Further, another advantage of the sol-gel method is that a silica glass plate can be produced with a simpler apparatus and at a lower cost than any other conventional silica glass plate produced by a process in which oxide is melted at a high temperature of about 2,000° C.

The present inventors have made a study to simply produce an optical waveguide from a porous gel plate produced by a sol-gel method having the above advantages. Namely, the present inventors have made a study to develop a method to provide the interior of a silica glass plate with a desired refractive index distribution under a gaseous condition. As a result, it has been found that the use, as a dopant, of germanium tetrachloride which is easily available and has a high vapor pressure at room temperature (about 90 Torr at room temperature) has the following advantages.

a) Germanium tetrachloride ($GeCl_4$) is uniformly doped into a porous silica gel plate even at room temperature.

b) Germanium tetrachloride has a very high diffusion rate, and reaches an adsorption equilibrium for a very short period of time.

c) The refractive index differs to a great extent depending upon degrees of the concentration of germanium tetrachloride doped into said porous silica gel plate.

The present inventors have made a further study and found that the following functions and effects can be produced by doping a porous silica gel plate with germanium tetrachloride in a gaseous phase.

a) When a porous silica gel plate is placed under an atmosphere of gaseous phase germanium tetrachloride, the concentration of germanium tetrachloride in the interior of the porous silica gel plate changes with a partial pressure of the germanium tetrachloride and a pore distribution and a bulk density of the porous silica gel plate.

b) When the partial pressure of germanium tetrachloride in the doping step is reduced, germanium tetrachloride adsorbed in the porous silica gel plate is desorbed from the vicinity of its surface, and a concentration distribution of germanium tetrachloride is formed in the interior of the porous silica gel plate.

c) The concentration distribution of germanium tetrachloride in the interior of the porous silica gel differs depending upon degrees of the partial pressure of germanium tetrachloride to be doped into the porous silica gel plate.

d) The germanium tetrachloride is hydrolyzed into germanium oxide and fixed in the interior of the porous silica gel plate by bringing the germanium tetrachloride into contact with water.

The process for producing a silica glass plate having a controlled refractive index distribution, provided by this invention, will be explained below.

At first, water within a porous silica gel plate produced by a sol-gel method is removed by placing the porous silica gel plate in a reactor and reducing the pressure inside the reactor into a substantially vacuum state preferably at a temperature suitably selected from between 15° C. and 250° C. Water is an impairment factor against doping of germanium tetrachloride at a next step.

Then, germanium tetrachloride is introduced into said reactor at a temperature suitably selected from between 15° C. and 50° C. up to a prescribed partial pressure, and the germanium tetrachloride is adsorbed on the interior of the porous silica gel plate up to an equilibrium adsorption amount corresponding to the partial pressure, etc. In this case, the equilibrium adsorption amount changes depending upon the partial pressure of germanium tetrachloride and the pore distribution and bulk density of the porous silica gel plate used. Therefore, it is necessary to preliminarily determine the equilibrium adsorption amount versus a porous silica gel plate to be used according to the adsorption isotherm prepared as a function of partial pressure of germanium tetrachloride and temperature.

Preferred is a porous silica gel plate having a pore distribution in which the average pore diameter is 2 nm to 5 nm and the maximum pore diameter is not more than 30 nm. And, preferred is a porous silica gel plate having a bulk density of 1.6 to 2.0 g/cm$^3$.

The porous silica gel plate on which germanium tetrachloride is adsorbed is placed under a germanium tetrachloride pressure lower than the equilibrium adsorption pressure of germanium tetrachloride and, preferably, at a temperature selected from between 15° C. and 50° C., whereby germanium tetrachloride is desorbed from the vicinity of the porous silica gel plate surface. In this case, the germanium tetrachloride desorption process differs depending upon the degree of the partial pressure of the germanium tetrachloride in the reactor. That is, when germanium tetrachloride having a high partial pressure is adsorbed in a porous silica gel plate and then the germanium tetrachloride partial pressure is reduced, the porous silica gel plate shows a germanium tetrachloride concentration distribution in which the concentration rises sharply from the vicinity of the porous silica gel plate surface and becomes flat in the central portion. When germanium tetrachloride having a low partial pressure is adsorbed, the germanium tetrachloride concentration in the porous silica gel plate shows a parabolic distribution curve having a peak in the central portion. It is also necessary to suitably select a time for the desorption of the germanium tetrachloride. That is, when the time for the desorption of germanium tetrachloride is too long, the germanium tetrachloride concentration in the porous silica gel plate shows a flat distribution as a whole, and it is impossible to provide the interior of a porous silica gel plate with a desired germanium tetrachloride concentration distribution.

A porous silica gel plate having a desired concentration distribution is prepared by changing the germanium tetrachloride partial pressure, etc., and then, the germanium tetrachloride is hydrolyzed into, and fixed as, germanium oxide (GeO$_2$) by bringing the porous silica gel plate into contact with water, preferably, at a temperature selected from between 0° C. and 100° C. The water with which the porous silica gel plate is to be brought into contact may be water, water vapor, water vapor contained in an inert gas, which does not react with germanium tetrachloride, such as nitrogen gas, etc. In this invention, germanium tetrachloride may be hydrolyzed by introducing water vapor into the reactor used for the formation of the concentration distribution in the porous silica gel plate.

The porous silica gel plate on which germanium tetrachloride is adsorbed is rendered nonporous by calcining it at a temperature of not less than 900° C., preferably 900 to 1,200° C., more preferably 1,000 to 1,200° C., whereby a silica glass plate having a controlled refractive index is produced.

This invention will be further explained by reference to drawings.

FIG. 1 is a schematic cross sectional view of an apparatus used for carrying out a process of this invention. A reactor 2 containing a porous silica gel plate 1 is connected to a vacuum line 5 through a cock 6. On end of the vacuum line 5 is connected to a vacuum pump (not shown) through a cock 8, and the other end of the vacuum line 5 is connected to a nitrogen gas or nitrogen gas/water vapor feed line (not shown) through a cock 9. The vacuum line 5 is also connected to a pressure gage 10 and to a container 4 containing germanium tetrachloride 3 through a cock 7.

Figure 2:
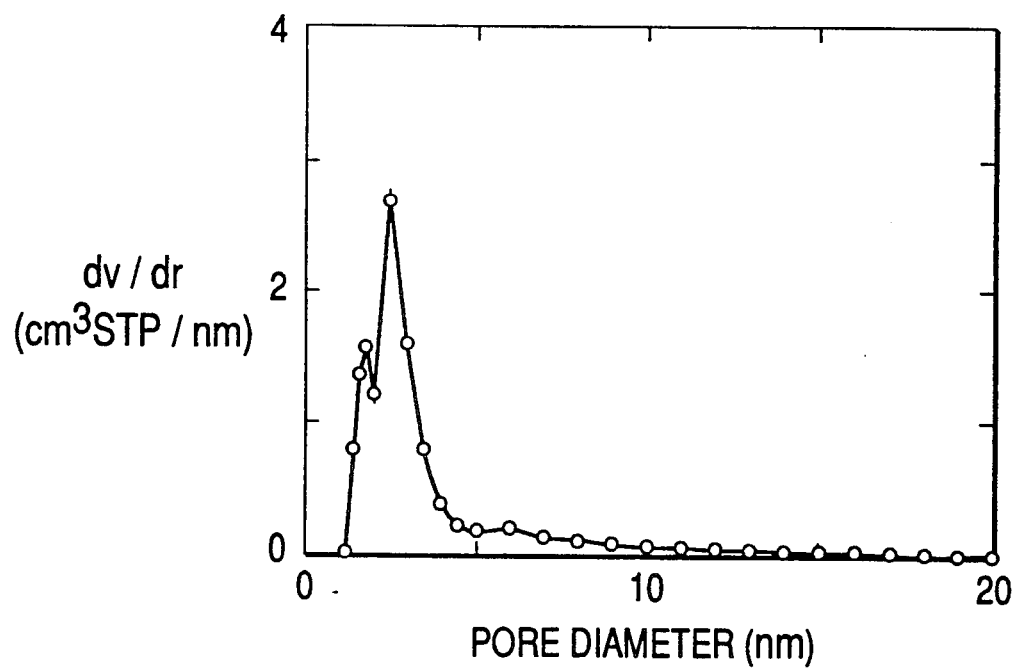
FIG. 2 is a graph showing one embodiment of a pore distribution of a porous silica gel plate used in this invention.
Figure 3:
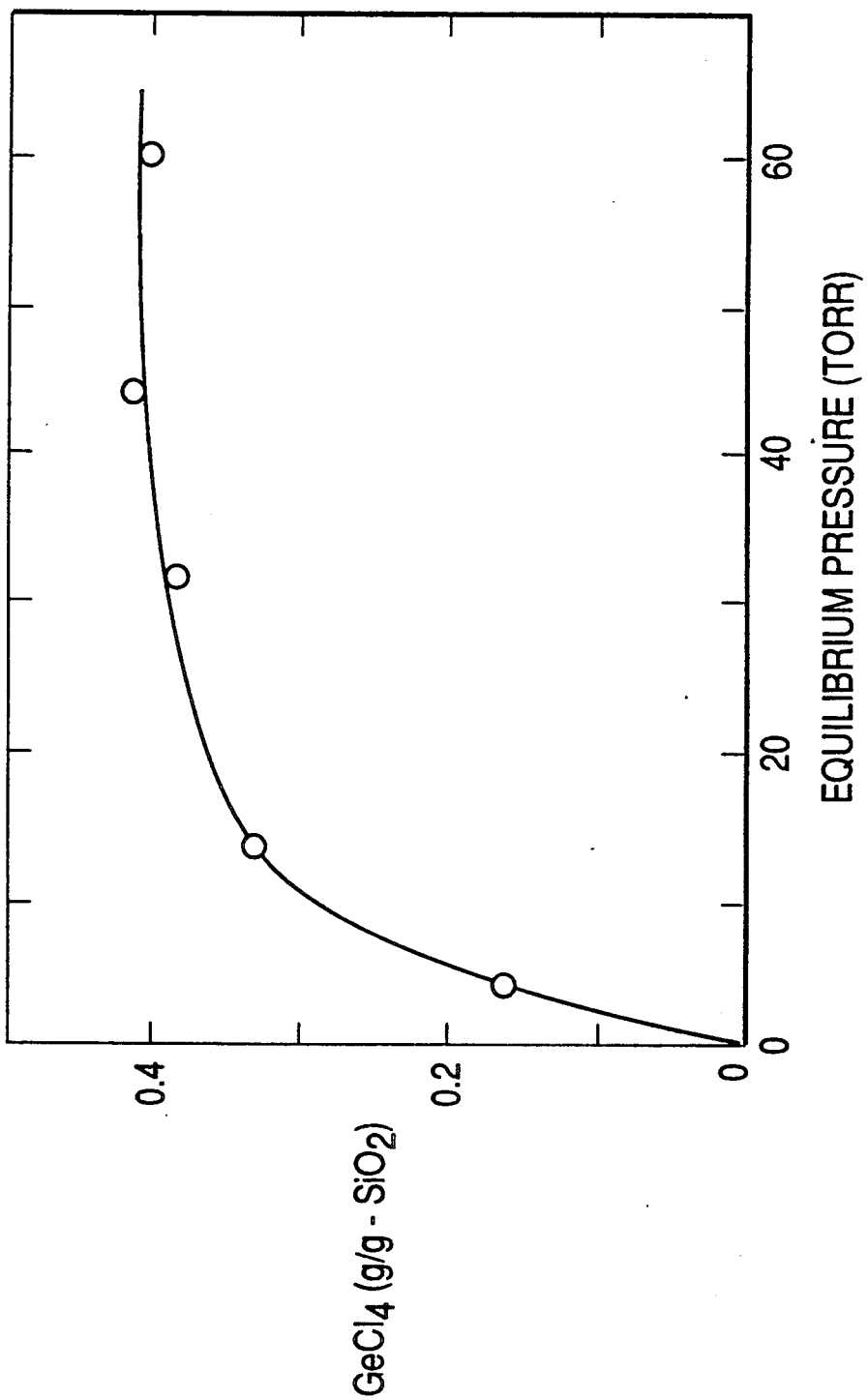
FIG. 3 is an adsorption isotherm for the adsorption of germanium tetrachloride on a porous silica gel plate.

The porous silica gel plate 1 which is prepared by hydrolyzing silicon alkoxide and tentatively calcining the resultant gel plate at 750° C., which has a pore distribution as shown in FIG. 2, a specific surface area of 400 m$^2$/g, a bulk density of 1.7 g/cm$^3$, which is a plate having a thickness of 1 mm, a width of 10 mm and a length of 20 mm and which exhibits a GeCl$_4$ adsorption isotherm as shown in FIG. 3, is placed in the reactor 2. The cocks 7 and 9 are closed, the cocks 6 and 8 are opened, and the vacuum pump was actuated to vacuum the reactor 2 and the vacuum line 5. The porous silica gel plate is heated to 150° C. to remove water which would remain inside the porous silica gel plate and impair GeCl$_4$ adsorption to be described later. Then, the temperature inside the reactor is cooled to room temperature. This dehydration is possible around room temperature, and it can be more effectively carried out by heating the porous silica gel plate. In general, a sufficient heating effect can be obtained by heating silica gel plate up to about 250° C. Therefore, this step is carried out at a temperature between 15° C. and 250° C., preferably between 100° C. and 250° C.

Then, at room temperature, the cock 8 is closed and the cock 7 is opened to gradually introduce GeCl$_4$ gas into the reactor 2 and the vacuum line 5 by utilizing a difference between a pressure inside the reactor 2 and a pressure inside the container 4. When the pressure gage 10 shows a prescribed pressure, the porous silica gel plate 1 is allowed to stand for a prescribed period of time to dope it with GeCl$_4$. For example, after the reactor is vacummed, GeCl$_4$ vapor pressure is introduced up to its partial pressure of 11 Torr, and the porous silica gel plate is allowed to stand for 5 minutes to dope GeCl$_4$ into the porous silica gel plate up to an absorption equilibrium. GeCl$_4$ is doped into the porous silica gel plate in an amount predetermined by the pore distribution and bulk density of the porous silica gel plate and the GeCl$_4$ partial pressure in the reactor.

The pore distribution of the porous silica gel plate is an important factor to determine a concentration distribution of GeCl$_4$ in a desorption step, and there is used a porous silica gel plate having a pore distribution necessary to obtain a desired GeCl$_4$ concentration distribution. Preferred and suitable is a porous silica gel plate having an average pore diameter of 2 to 5 μm and a maximum pore diameter of not more than 30 μm. More preferred is a porous silica gel plate having an average pore diameter of 3 to 5 $\mu$m and a maximum pore diameter of not more than 20 $\mu$m. When a porous silica gel plate having too small an average pore diameter is used, it is difficult to dope such a porous silica gel plate with $GeCl_4$. When a porous silica gel plate having too large an average pore diameter is used, such a porous silica gel plate is liable to fracture when rendered nonporous at the final step.

The bulk density of the porous silica gel plate is a factor which can be adjusted at the step of the above tentative calcining and which determines a possible maximum doping amount of $GeCl_4$. A porous silica gel plate having a suitable bulk density for a maximum refractive index difference of an intended silica glass plate is selected. However, a porous silica gel plate having too small a bulk density is liable to fracture in each of the steps. In general, a porous silica gel plate having a bulk density of 1.6 g/cm$^3$ to 2.0 g/cm$^3$ does not fracture and can be doped with a necessary amount of $GeCl_4$. The bulk density is preferably 1.6 g/cm$^3$ to 1.8 g/cm$^3$.

The partial pressure of $GeCl_4$ can be controlled by a heating temperature in the container 4. When the heating temperature is too high, the doping rate increases excessively, or it is difficult to handle $GeCl_4$, since $GeCl_4$ has a sufficiently high vapor pressure even at room temperature. In general, a porous silica gel plate is doped with a necessary amount of $GeCl_4$ at a temperature between 15° C. and 50° C.

Then, the cock 8 is opened and the vacuum pump is actuated to reduce the $GeCl_4$ pressure in the vacuum line and the reactor 2 to a prescribed pressure lower than the pressure at a doping step. Thereafter, the cock 8 is closed and the doped porous silica gel plate is kept for a prescribed period of time to desorb $GeCl_4$ from the porous silica gel plate surface under said prescribed pressure of $GeCl_4$, whereby an intended $GeCl_4$ concentration distribution is obtained in which the porous silica gel plate has a high $GeCl_4$ concentration in its interior portion and a low $GeCl_4$ concentration in its periphery and the $GeCl_4$ concentration continuously changes from the interior portion to the periphery. When the desorption is carried out for too long a period of time, $GeCl_4$ is desorbed even from the interior portion nearly completely since the desorption rate is high, and only a flat distribution can be obtained. It is desirable to complete the desorption within a few minutes.

For example, the vacuum pump is actuated and the $GeCl_4$ gas partial pressure in the reactor is reduced to about zero Torr over 3 minutes to selectively desorb $GeCl_4$ from the porous silica gel plate surface, whereby a $GeCl_4$ concentration distribution is formed in the interior of the porous silica gel plate.

The desorption rate is high and the desorption at too high a temperature is therefore not desirable. The desorption is carried out preferably at a temperature between 15° C. and 50° C.

$GeCl_4$ is adsorbed according to an adsorption isotherm shown in FIG. 3. When adsorption is carried out in a region (a) in FIG. 3, a distribution shown in FIG. 4(1) is obtained. When adsorption is carried out in a region (b) in FIG. 3, a steep distribution shown in FIG. 4(2) is obtained in which the concentration in the interior is flat and those in the peripheral portions are sharply lowered. Therefore, according to the present invention, the concentration distribution can be changed from a nearly stepwise distribution to a parabolic distribution by controlling the $GeCl_4$ partial pressure at a doping step.

Further, the cock 8 is closed, and the cock 9 is opened to introduce $N_2$ gas into the reactor until the pressure in the reactor is brought into an atmospheric pressure. Thereafter, the cock 9 is closed, and the porous silica gel plate 1 having a concentration distribution of $GeCl_4$ is promptly taken out of the reactor 2 and immersed and kept in water for a prescribed period of time to hydrolyze $GeCl_4$, whereby $GeCl_4$ is fixed as germanium oxide ($GeO_2$). In this case, the porous silica gel plate is kept in water for a prescribed period of time, whereby a $GeO_2$ distribution can be formed in nearly the same form as that of the $GeCl_4$ distribution formed in the above stuffing and unstuffing steps.

For example, after a $GeCl_4$ concentration distribution is formed, $N_2$ gas is introduced into the reactor until the pressure in the reactor becomes atmospheric pressure. Immediately thereafter, the porous silica gel plate is taken out, immersed in water and kept in the water for 4 hours to hydrolyze $GeCl_4$ and fix it as $GeO_2$.

In this fixing step, the time for immersing the porous silica gel plate in water is set at a period of about several hours, whereby Ge can be fixed without deforming the $GeCl_4$ concentration distribution.

When water having too low a temperature is used, the silica gel plate sometimes fracture. The water temperature is preferably 10 to 100° C.

The above hydrolysis can be carried out not only by the above immersion method but also by a method of introducing water vapor into the reactor through the vacuum line.

For example, after a $GeCl_4$ concentration distribution is formed, $N_2$ gas containing water vapor, preferably $N_2$ having saturated water vapor, is continuously introduced into the reactor to hydrolyze $GeCl_4$ and fix it as $GeO_2$ in the reactor. According to this method, the adsorption, desorption, hydrolysis and fixing can be carried out as a series of steps in a vacuum line without taking the porous silica gel plate out of the reactor. Therefore, improvement in productivity can be expected.

The porous silica gel plate doped with $GeO_2$ is dried, and then calcined by heating it up to a temperature of 900° C. or higher to render it nonporous, whereby a silica glass plate having an internal refractive index distribution can be obtained.

The calcining temperature is in such a range that the porous silica gel plate can be effectively rendered nonporous. A low energy cost can be realized by setting the calcining temperature at the lowest level possible within such a range. When the calcining temperature is lower than 900° C., the porous silica gel plate is only partially rendered nonporous. When it is between 900° C. and 1,200° C., the porous silica gel plate can be completely rendered nonporous. The calcining temperature is preferably between 950° C. and 1,200° C., more preferably between 1,000° C. and 1,200° C.

Figure 4:
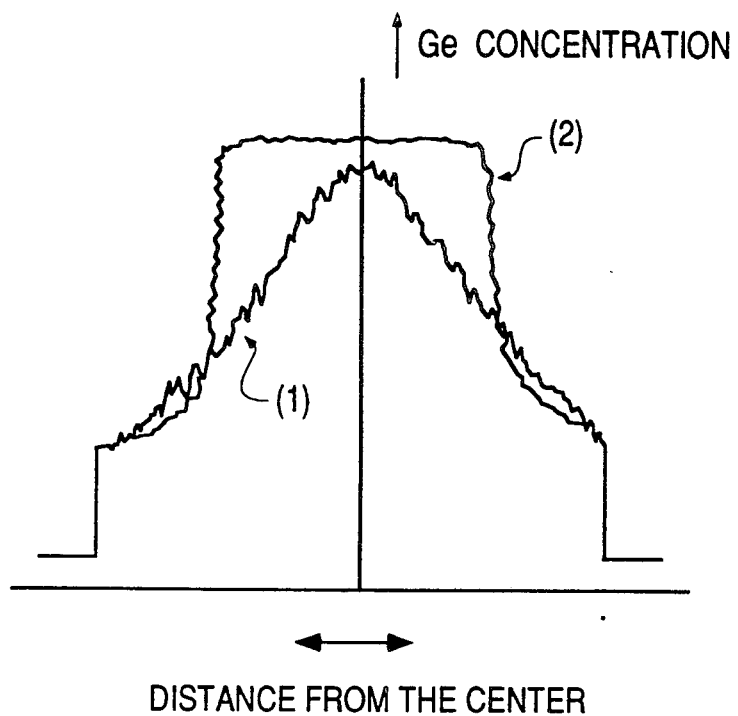
FIG. 4 is a graph showing a distribution, taken in the thickness direction, of a germanium concentration within a silica glass plate obtained by a process of this invention.

When a silica glass plate obtained according to the above procedures is analyzed with regard to the $GeO_2$ concentration in the glass thickness direction with an electron probe microanalyzer (EPMA), a continuous distribution is obtained in which the concentration is high in the interior and is gradually decreasing toward the periphery as shown in FIG. 4(1). This concentration distribution corresponds to the refractive index distribution of the silica glass plate.

The GeO₂ concentration distribution of the silica glass plate in the glass thickness direction changes depending upon not only an initial gel properties but also where $GeCl_4$ is introduced in the adsorption isotherm shown in FIG. 3 for the adsorption and desorption. Therefore, the intended refractive index distribution can be formed with ease for a short period of time as described above.

According to the method of this invention, a porous silica gel plate prepared by a sol-gel method can be uniformly, very easily and highly accurately doped with $GeCl_4$ with a simple apparatus by means of an adsorption equilibrium, and an intended refractive index distribution can be formed for a very short period of time by the combined use of the above doping procedure and a simple procedure of placing the so-doped porous silica gel plate under an atmosphere having a $GeCl_4$ partial pressure lower than the pressure for doping procedures.

The method of this invention can be effectively applied to the manufacture of a planar optical waveguide, etc., and is a useful technique to manufacture optical devices such as an optical coupler, etc., at a low cost, which is important in the opto-electronics field.

EXAMPLES

This invention will be explained further in detail by reference to Examples and Comparative Example.

EXAMPLE 1

Commercially available tetramethoxysilane (Si(OCH₃)₄) was hydrolyzed with a 0.05N hydrochloric acid aqueous solution to prepare a sol, and the sol was put in a plastic container having a width of 3 cm, a length of 5 cm and a depth of 5 mm and allowed to stand to form a gel plate. The gel plate was dried under an atmosphere having a temperature of 25° C. and a relative humidity of 40%, and calcined in an electric oven at 750° C. to give a porous silica gel plate having a width of 1 cm, a length of 2 cm and a thickness of 1 mm.

The porous silica gel plate was measured for an $N_2$ gas adsorption isotherm, and its pore distribution as shown in FIG. 2 was obtained by calculation on the basis of the Cranston-Inkley method (Adv. in Catalysis, 9,143 (1975). In this calculation method, the form of each pore is assumed to be cylindrical, and the specific area of the gel plate calculated on the basis of this method was 400 m²/g. The average pore diameter was 2.9 mm, and the pore volume was 0.25 cm³/g. The bulk density of the porous silica gel plate was calculated to be 1.7 g/cm³ when the $SiO_2$ density was taken as 2.2.

The above porous silica gel plate was placed in a reactor 2, and while $GeCl_4$ vapor was introduced into the reactor 2 at 25° C., the relation between $GeCl_4$ partial pressure and amount of $GeCl_4$ adsorbed on the porous silica gel plate was measured to give an adsorption isotherm as shown in FIG. 3.

The adsorption isotherm changes depending upon the porous silica gel properties, i.e. pore distribution and bulk density, even at a constant temperature.

The above porous silica gel plate was heated under vacuum in the reactor 2 at 150° C. for 1 hour to remove water, and the temperature inside the reactor 2 was cooled to room temperature. $GeCl_4$ vapor was introduced into the reactor 2 over about 3 minutes up to a $GeCl_4$ partial pressure of 11 Torr, and the porous silica gel plate was kept in this state for 1 minutes to carry out adsorption of $GeCl_4$ on the porous silica gel plate up to an adsorption equilibrium. The adsorption amount of $GeCl_4$ was 0.30 g per 1 g of $SiO_2$.

Then, the reactor 2 was vacuumed over 3 minutes until the atmosphere within the reactor 2 became about 0 Torr, and the porous silica gel plate was kept inside the reactor 2 for 1 minute to desorb part of $GeCl_4$ adsorbed on the porous silica gel plate. The pressure in the reactor 2 was brought back to an atmospheric pressure by introducing $N_2$ gas, and the porous silica gel plate was taken out of the reactor 2 and immersed in pure water at 25° C. for 4 hours to hydrolyze $GeCl_4$ and fix it in the porous silica gel plate as $GeO_2$.

The degree of elution of germanium into water on this time scale is small as compared with the degree of the desorption of $GeCl_4$, and the Ge concentration distribution is mainly determined during the desorption process. The porous silica gel plate was taken out of the water, dried at room temperature, and heated to 1,000° C. with an electric oven to render it nonporous.

Figure 6:
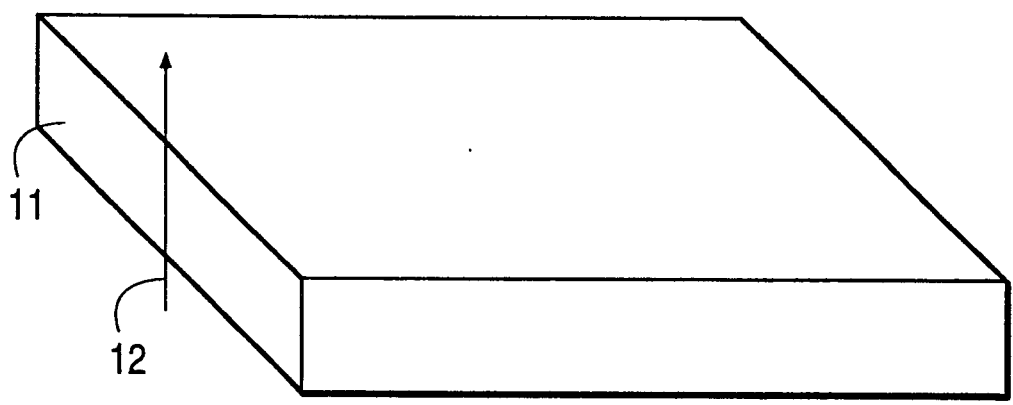
FIG. 6 is a schematic view showing the form of a porous silica gel plate used in Examples and Comparative Examples.

The so-obtained $GeO_2$-doped silica glass plate, schematically shown in FIG. 6, was fixed with an epoxy resin with excluding a surface 11 shown in FIG. 6, and the surface 11 was polished to form a smooth surface. The smooth surface was measured with EPMA for a Ge concentration distribution in the thickness direction along the line shown by an arrow 12 in the surface 11 of FIG. 6 to show that the Ge concentration was decreased parabolically toward the periphery as shown in FIG. 4(1), and the refractive index difference between the interior portion and the periphery was 0.012.

EXAMPLE 2

A porous silica gel plate which was prepared under the same conditions as those of Example 1 and had the same properties as those of the porous silica gel plate of Example 1 was allowed to adsorb $GeCl_4$ at 25° C. under a $GeCl_4$ partial pressure of 40 Torr over 2 hours up to an adsorption equilibrium, and the porous silica gel plate was subjected to the desorption, hydrolyzed, calcined and rendered nonporous in the same manner as in Example 1. The resultant Ge-doped silica glass had a Ge concentration distribution as shown in FIG. 4(2), which is steeper than that of the silica glass obtained in Example 1.

EXAMPLE 3

A porous silica gel plate which was prepared under the same conditions as those of Example 1 and had the same properties as those of the porous silica gel plate of Example 1 was stuffed and unstuffed with $GeCl_4$ in a reactor in the same manner as in Example 1, and $N_2$ gas having saturated water vapor was continuously introduced into the reactor at a rate of 20 ml/minute for 2 hours for $GeCl_4$ hydrolysis, instead of immersing the porous silica gel plate in water. Thereafter, the porous silica gel plate was treated in the same manner as in Example 1 to give a Ge-doped silica glass plate, which has nearly the same Ge concentration distribution as that shown in FIG. 4(1).

COMPARATIVE EXAMPLE

Figure 5:
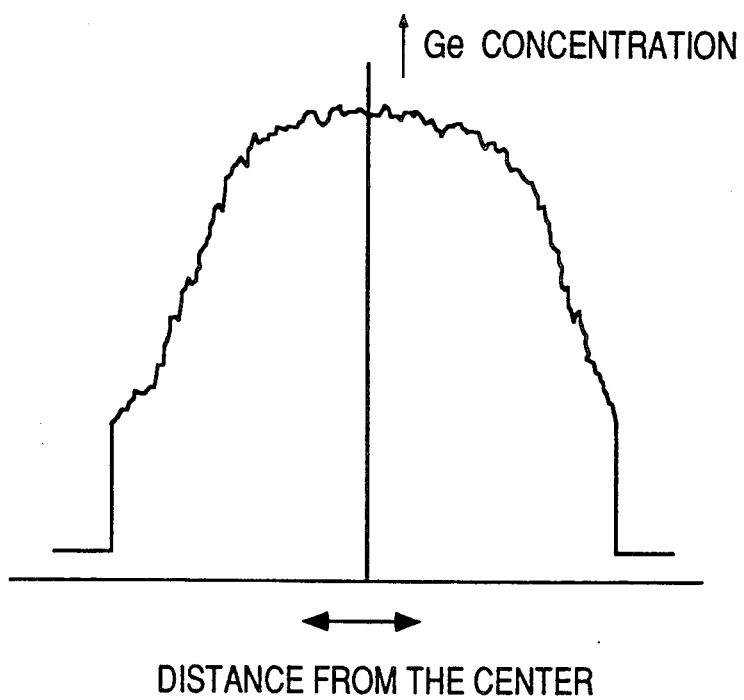
FIG. 5 is a graph showing a distribution, taken in the thickness direction, of a germanium concentration within a silica glass plate obtained by the process described in Comparative Example 1.

A $GeCl_4$-doped porous silica gel plate was prepared in the same manner as in Example 1, immersed in water for 4 hours to hydrolyze $GeCl_4$ without carrying out the desorption step, and calcined to render it nonporous. The resultant Ge-doped silica glass plate was measured for a Ge concentration distribution in the thickness direction in the same manner as in Example 1. As shown in FIG. 5, this silica glass plate had a nearly uniform Ge distribution although slight Ge elution was observed in the periphery.

What is claimed is:

1. A process for producing a silica glass plate having a controlled refractive index from a porous silica gel plate produced by the sol-gel method, which comprises the steps of:

(a) placing said porous silica gel plate in a reactor and reducing the pressure in said reactor to a substantially vacuum state to thereby remove water within said porous silica gel plate, the step being carried out at a temperature of 15° C. to 250° C., (b) introducing germanium tetrachloride gas into said reactor so as to directly contact said porous silica gel plate in a gaseous state at a reactor partial pressure appropriate to establish an absorption equilibrium between a desired concentration of germanium tetrachloride in said porous silica gel plate and the germanium tetrachloride gas introduced into said reactor, to thereby dope said porous silica gel plate and maintaining said partial pressure of germanium tetrachloride for a period of time sufficient to achieve the absorption equilibrium, the step being carried out at a temperature of 15° C. to 50° C., (c) reducing the partial pressure of germanium tetrachloride in step (b) to thereby desorb germanium tetrachloride from the surface of the porous silica gel plate and form a concentration distribution gradient of germanium tetrachloride between a higher level in the interior of said porous silica gel plate and a lower level in the outward portions thereof, the step being carried out at a temperature of 15° C. to 50° C.

(d) contacting said porous silica gel plate having said concentration distribution with water within or outside the reactor to thereby hydrolyze the germanium tetrachloride and fix it within said porous silica gel plate as germanium oxide, the step being carried out at a temperature of 10° C. to 100° C., drying the porous silica gel plate doped with germanium oxide, and (e) calcining said porous silica gel plate from step (d) at a temperature of from 900° C. to 1200° C. to render it nonporous to thereby form a silica glass plate having a controlled refractive index.

2. A process according to claim 1, wherein the step (d) is carried out by removing the porous silica gel plate having the concentration distribution from the reactor and immersing it in water to hydrolyze the germanium tetrachloride.

3. A process according to claim 1, wherein the step (d) is carried out by introducing water vapor into the reactor and contacting the porous silica gel plate having the concentration distribution with water vapor to hydrolyze the germanium tetrachloride.

4. A process according to claim 1, wherein the step (d) is carried out by introducing nitrogen gas containing water vapor into the reactor and contacting the porous silica gel plate having the concentration distribution with the nitrogen gas to hydrolyze the germanium tetrachloride.

5. A process according to claim 1, wherein the concentration of germanium tetrachloride in the porous silica gel plate which will exist at any point in the processing is controlled by selecting a porous gel plate having a desired pore distribution and a desired bulk density.

6. A process according to claim 5, wherein the porous silica gel plate has a pore distribution in which the average pore diameter is 2 to 5 nm and a maximum pore diameter of not more than 30 nm.

7. A process according to claim 5, wherein the bulk density of the porous silica gel plate is 1.6 to 1.0 g/cm$^3$.

* * * * *